US012253057B2

(12) United States Patent
Stephens

(10) Patent No.: US 12,253,057 B2
(45) Date of Patent: Mar. 18, 2025

(54) HYDRAULIC TURBINE MOTOR

(71) Applicants: Robert J. Stephens, Winnipeg (CA); Alvin Gregorash, Winnipeg (CA)

(72) Inventor: Robert J. Stephens, Winnipeg (CA)

(73) Assignee: Alvin Gregorash, Winnipeg (CA)

( * ) Notice: Subject to any disclaimer, the term of this patent is extended or adjusted under 35 U.S.C. 154(b) by 0 days.

(21) Appl. No.: 18/442,858

(22) Filed: Feb. 15, 2024

(65) Prior Publication Data

US 2024/0280072 A1 Aug. 22, 2024

Related U.S. Application Data

(60) Provisional application No. 63/485,710, filed on Feb. 17, 2023.

(51) Int. Cl.

| | |
|---|---|
| ***F03B 1/00*** | (2006.01) |
| ***F03B 1/02*** | (2006.01) |
| ***F03B 1/04*** | (2006.01) |
| ***F03B 5/00*** | (2006.01) |
| ***F03B 11/00*** | (2006.01) |
| ***F03B 15/06*** | (2006.01) |
| ***F03B 15/20*** | (2006.01) |

(52) U.S. Cl.

CPC .................. *F03B 1/00* (2013.01); *F03B 1/02* (2013.01); *F03B 1/04* (2013.01); *F03B 5/00* (2013.01); *F03B 11/004* (2013.01); *F03B 15/06* (2013.01); *F03B 15/20* (2013.01); *F05B 2240/241* (2013.01)

(58) Field of Classification Search

CPC ...... F03B 1/00; F03B 1/02; F03B 1/04; F03B 11/004; F03B 5/00; F03B 15/04; F03B 15/06; F03B 15/20; F01D 1/026; F01D 1/34; F01D 1/36; F05B 2240/241; F05B 2240/2411

See application file for complete search history.

(56) References Cited

U.S. PATENT DOCUMENTS

| | | | |
|---|---|---|---|
| 827,165 | A | 7/1906 | Mariner |
| 849,859 | A | 4/1907 | Scott |
| 935,322 | A | 9/1909 | Peterson |
| 1,461,620 | A | 7/1923 | Knapp |
| 1,579,146 | A | 3/1926 | Richardson |

(Continued)

FOREIGN PATENT DOCUMENTS

CA 2143022 A1 * 8/1996

*Primary Examiner* — Christopher Verdier

(74) *Attorney, Agent, or Firm* — Ryan W. Dupuis; Michael R. Williams; Ade & Company Inc.

(57) ABSTRACT

A hydraulic turbine motor has a rotor housing and a rotor rotatably supported in the rotor housing that defines a plurality of rotor chambers arranged circumferentially about the rotor in which each rotor chamber has a respective outlet port. Injectors are supported at circumferentially spaced locations about the housing so as to be arranged to inject hydraulic fluid in a generally tangential direction relative to the rotor axis into selected ones of the rotor chambers in which the injectors include first and second injectors. A valve mechanism is configured to open any outlet port in which the respective rotor chamber is in communication with one of the first injectors and to maintain closed any outlet port in which the respective rotor chamber is in communication with one of the second injectors.

15 Claims, 5 Drawing Sheets

(56) References Cited

U.S. PATENT DOCUMENTS

| | | | | |
|---|---|---|---|---|
| 1,798,679 | A | 3/1931 | Kelliher | |
| 2,976,687 | A * | 3/1961 | Nichols | F03B 15/20<br>415/45 |
| 3,676,015 | A | 7/1972 | Hodgman, Jr. | |
| 4,218,176 | A | 8/1980 | Gawne | |
| 4,232,991 | A | 11/1980 | Gamell | |

* cited by examiner

HYDRAULIC TURBINE MOTOR

This application claims the benefit under 35 U.S.C.119 (e) of U.S. provisional application Ser. No. 63/485,710, filed Feb. 17, 2023.

FIELD OF THE INVENTION

The present invention relates to hydraulic turbines and motors and a method of operating hydraulic turbines and motors.

BACKGROUND

Various forms of hydraulic motors and fluid turbines and the like are known in the prior art as generally described in the following U.S. Pat. No. 4,232,991 by Gamell; U.S. Pat. No. 4,218,176 by Gawne; U.S. Pat. No. 3,676,015 by Hodgman Jr; U.S. Pat. No. 1,798,679 by Kelliher; U.S. Pat. No. 1,579,146 by Richardson; U.S. Pat. No. 1,461,620 by Knapp; U.S. Pat. No. 935,322 by Peterson; U.S. Pat. No. 849,859 by Scott; U.S. Pat. No. 827,165 by Mariner.

Canadian Patent Application No. 2,143,022 by Stephens discloses a Hydraulic Motor in which is intended to operate at maximum speed under no load, but as load is increased, the speed drops and the power output increases.

SUMMARY OF THE INVENTION

It is an object of the present invention to provide a hydraulic turbine motor which can be used in place of conventional hydraulic motors and which operates at better efficiency than some prior art motors.

According to one aspect of the invention there is provided a hydraulic turbine motor comprising:

- a rotor housing;
- a rotor rotatably supported in the rotor housing for rotation about a respective rotor axis, the rotor defining a plurality of rotor chambers arranged circumferentially about the rotor, each rotor chamber having a respective outlet port;
- a plurality of injectors supported at circumferentially spaced locations about the housing so as to be arranged to inject hydraulic fluid in a generally tangential direction relative to the rotor axis into selected ones of the rotor chambers, the injectors including at least one first injector and at least one second injector; and
- a valve mechanism configured to open any outlet port in which the respective rotor chamber is in communication with said at least one first injector and to maintain closed any outlet port in which the respective rotor chamber is in communication with said at least one second injector.

When the valve mechanism comprises an end wall of the rotor housing oriented transversely to the rotor axis which includes at least one outlet opening therein, preferably said at least one outlet opening extends circumferentially so as to be arranged to communicate simultaneously with two adjacent ones of the outlet ports over a portion of the rotation of the rotor.

Preferably the rotor defines a number of rotor chambers which is more than double a number of the injectors.

In the illustrated embodiment, said at least one first injector and said at least one second injector are equal in number.

The injectors preferably alternate between first and second injectors in the circumferential direction.

The valve mechanism is preferably arranged to open any outlet port in which the respective rotor chamber is in communication with said at least one first injector prior to communication with said at least one injector port.

The valve mechanism is preferably arranged to maintain open any outlet port in which the respective rotor chamber is in communication with said at least one first injector until after said at least one first injector discontinues communication with said at least one first injector.

The turbine motor may further comprise: (i) an auxiliary rotor housing including a rotor, a plurality of injectors, and a valve mechanism arranged in similar configuration; (ii) a common axle coupling the two rotors for rotation together about the rotor axis; (iii) each valve mechanism comprising an end wall of the respective rotor housing oriented transversely to the rotor axis and including at least one outlet opening therein; and (iv) a common outlet chamber between the two rotor housings so as to be in direct communication with the outlet openings of the valve mechanisms of both rotor housings.

According to another aspect of the present invention there is provided a hydraulic turbine motor assembly comprising:

- a pair of rotor housings;
- a rotor rotatably supported in each rotor housing for rotation about a common rotor axis, each rotor defining a plurality of rotor chambers arranged circumferentially about the respective rotor and each rotor chamber having a respective outlet port;
- a plurality of injectors supported at circumferentially spaced locations about each housing so as to be arranged to inject hydraulic fluid in a generally tangential direction relative to the rotor axis into selected ones of the rotor chambers;
- a valve mechanism associated with each rotor housing which comprises an end wall of the respective rotor housing oriented transversely to the rotor axis and at least one outlet opening in the end wall, the outlet openings being configured to open at least some of the outlet ports of respective ones of the rotor chambers during communication of the respective ones of the rotor chambers with the injectors; and
- a common outlet chamber between the two rotor housings which is in direct communication with the outlet openings of the valve mechanisms of both rotor housings.

According to another aspect of the present invention there is provided a method of operating a hydraulic turbine motor having a rotor housing, a rotor rotatably supported in the rotor housing for rotation about a respective rotor axis and defining a plurality of rotor chambers arranged circumferentially about the rotor, and a outlet port for each chamber, the method comprising:

- injecting hydraulic fluid at circumferentially spaced injection locations about the housing in a generally tangential direction relative to the rotor axis into selected ones of the rotor chambers;
- intermittently opening the outlet port of each chamber during the injection of hydraulic fluid into the chamber at one or more injection locations and maintaining the outlet port of each chamber closed during the injection of hydraulic fluid into the chamber at one or more other injection locations.

The method may further include opening the outlet ports of adjacent ones of the rotor chambers over a portion of the rotation of the rotor at said one or more injection locations.

The method may further include arranging said one or more injection locations where the outlet ports are opened to be less than half the number of rotor chambers.

Preferably the injection locations where the outlet ports are open and the injection locations where the outlet ports are closed are equal in number. Preferably the injection locations alternate in the circumferential direction between outlet ports which are opened and outlet ports which are closed during injection of hydraulic fluid.

The method may further include including opening the outlet ports prior to communication of the respective chamber with the respective injection location.

The method may further include maintaining the opened outlet ports open until after the chamber no longer received injected hydraulic fluid therein.

The rotor operates as an enclosed turbine wheel, full of liquid in operation with the intermittent injection and exhaustion of liquid from the chambers as they progress around the rotor axis. Under no load, the rotor speed is maximum, and the power output and exhaust flow are minimal. As load is increased, the speed will drop and the exhaust flow will increase. The injectors are positioned relative to the opening of the outlet ports so that some chambers are exhausted simultaneously with injection of fluid therein while other chambers are injected with fluid for subsequent exhausting further along in the rotation of the rotor. The turbine motor thus takes advantage of both properties of a continuous flow turbine and properties of a positive displacement motor.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
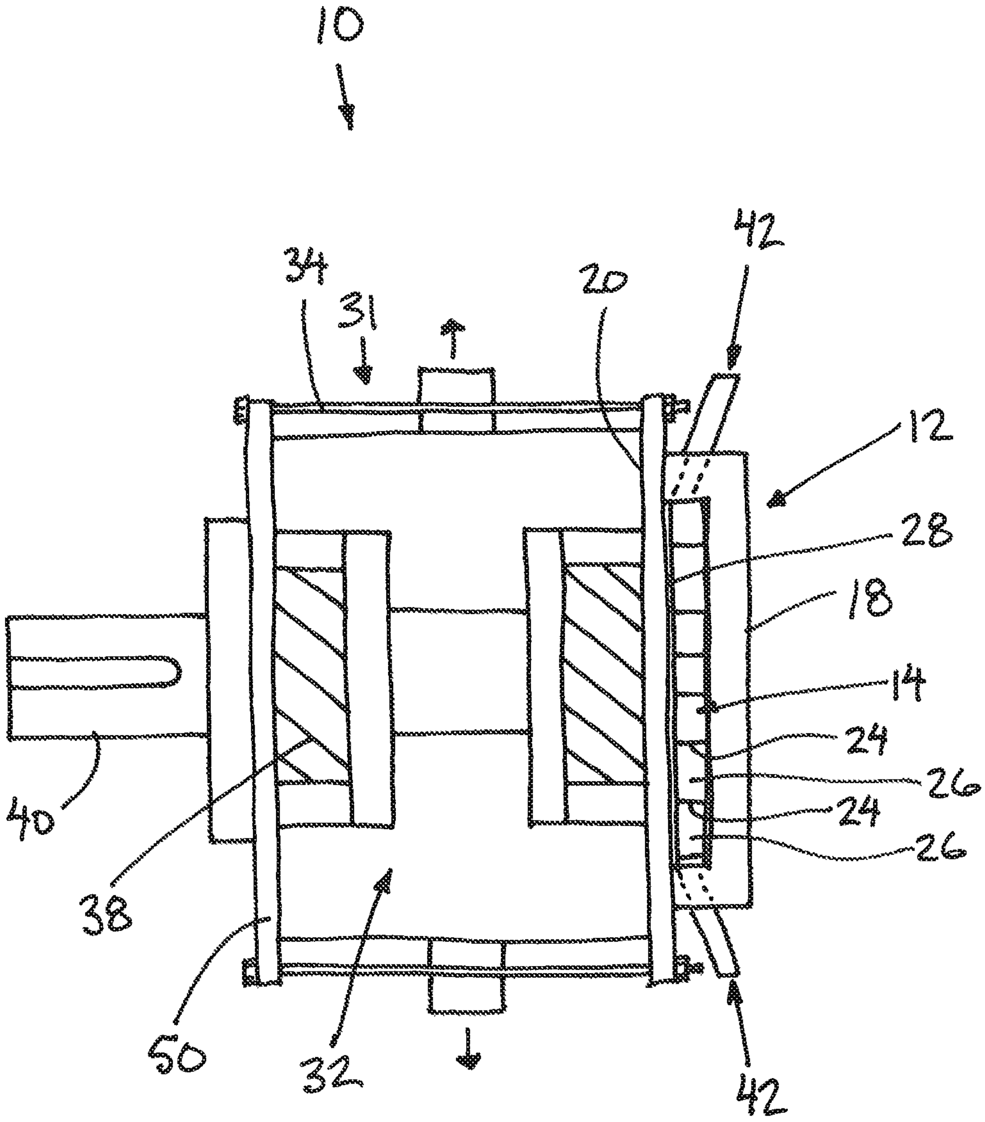
FIG. 1 is a sectional side view of the turbine motor of the present invention according to a first embodiment.
Figure 2:
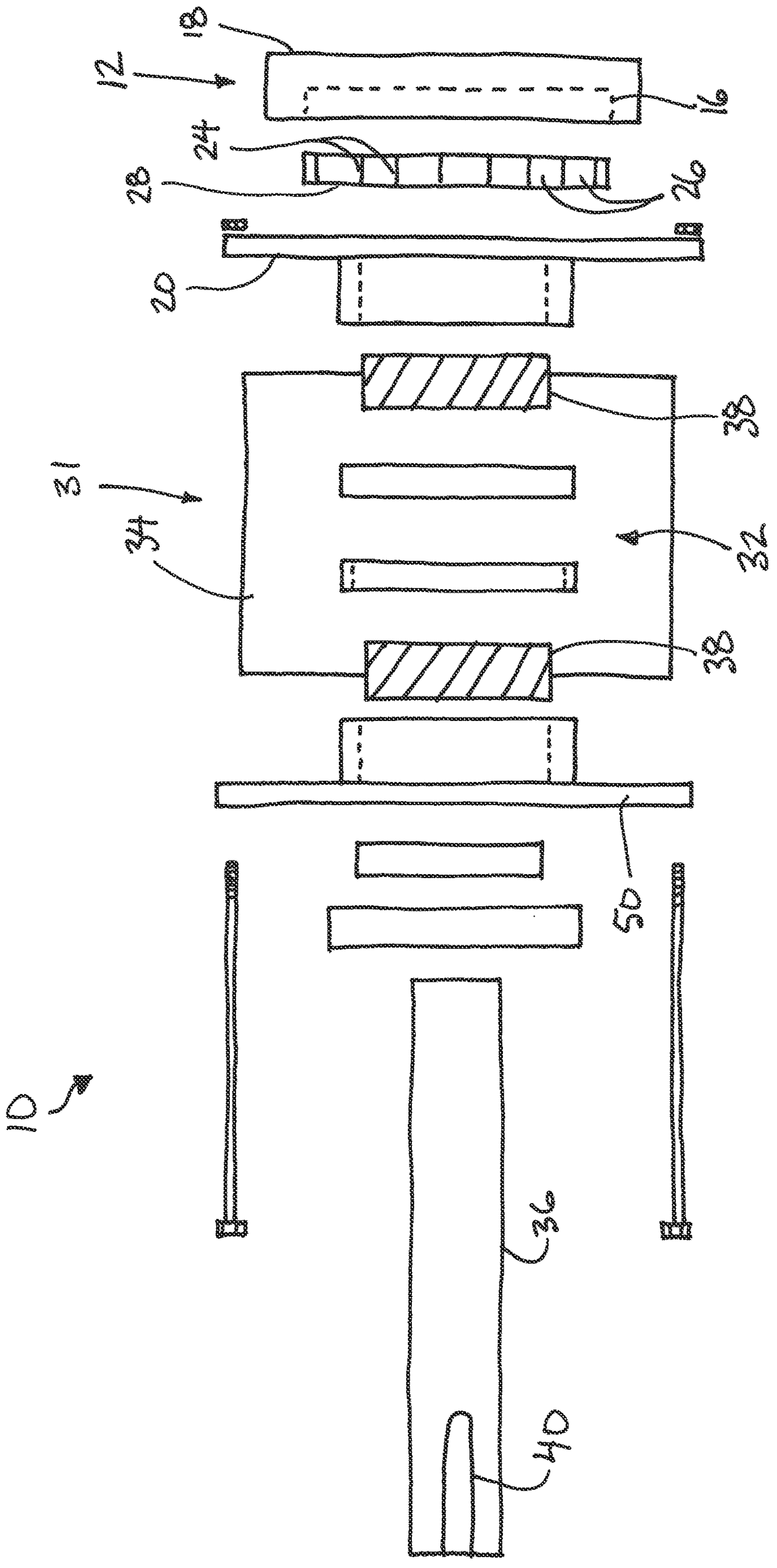
FIG. 2 is an exploded side elevational view of the turbine motor according to the first embodiment of FIG. 1.
Figure 3:
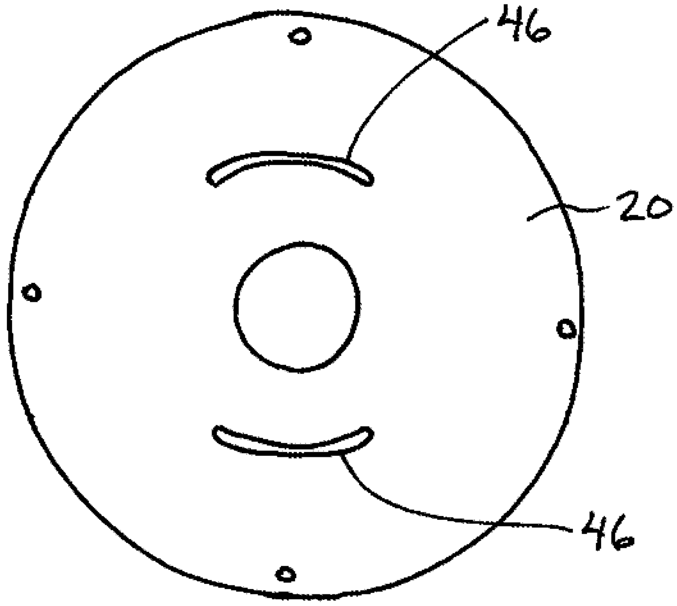
FIG. 3 is an end view of the valve plate of the valve mechanism according to the first embodiment of FIG. 1.
Figure 4:
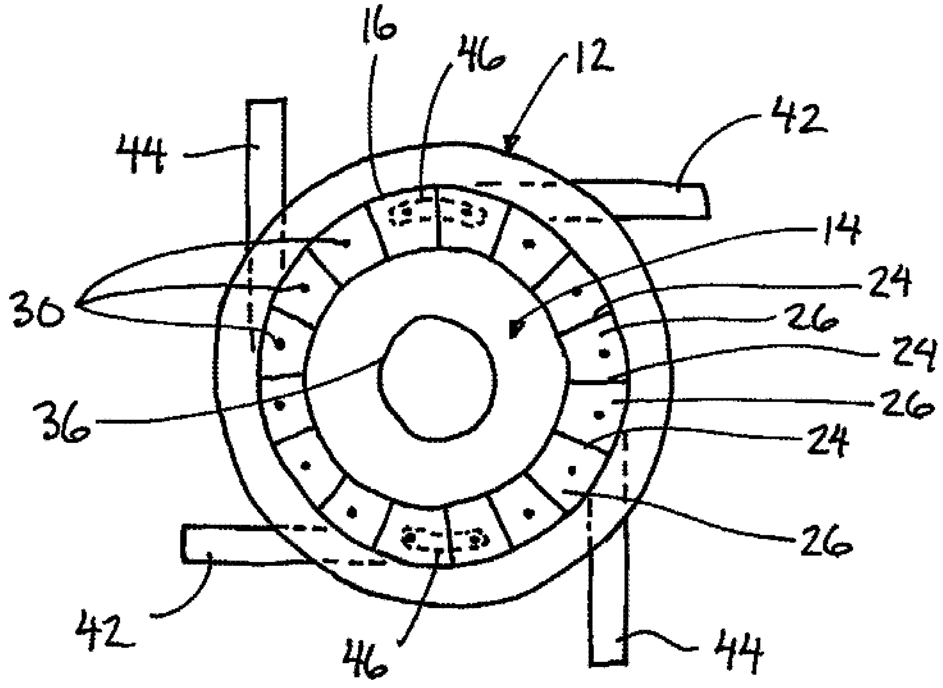
FIG. 4 is an end view of the rotor inside the rotor housing according to the first embodiment of FIG. 1.

Referring to the accompanying figures, there is illustrated a hydraulic turbine motor generally indicated by reference numeral 10. Although various embodiments of the hydraulic turbine motor are shown in the accompanying figures, the common features of the various embodiments will first be described.

In each instance, the turbine motor includes a rotor housing 12 defining a main chamber which is generally cylindrical in shape for receiving a rotor 14 therein. The rotor housing includes a peripheral wall 16 which is generally cylindrical to define the circumferential boundary of the main chamber. A first end wall 18 lies perpendicularly to an axial direction of the main chamber for enclosing one end of the chamber. A valve plate 20 of a valve mechanism, described in further below, spans perpendicularly to the axial direction to enclose the opposing end of the main chamber. The valve plate effectively defines a second end wall such that the first and second end walls enclose axially opposed ends of the main chamber.

The rotor 14 is supported within the main chamber of the rotor housing for rotation relative to the rotor housing about a respective rotor axis which is concentric with the peripheral wall 16. The rotor 14 includes a circular core 22 and a plurality of radial vanes 24 mounted on the circular core at circumferentially spaced positions to span radially outward from the circular core towards the outer peripheral wall of the rotor housing. The radial vanes define a plurality of rotor chambers 26 arranged in series with one another in the circumferential direction.

In the illustrated embodiment 16 vanes define 16 equally sized rotor chambers 26 about the periphery of the rotor. Each rotor chamber is bound in the radial direction at an inner side by the core 22 and at the outer side by the peripheral wall 16 of the rotor housing. In the circumferential direction each rotor chamber 26 is bound between an adjacent pair of the vanes 24. In the axial direction, the rotor chambers are bound at one end by the first end wall 18 of the rotor housing and are bound at the opposing end by a rotor wall 28 which encloses the end of the rotor opposite the first end wall. The rotor wall is an end plate which is circular and oriented perpendicularly to the rotor axis in fixed connection to the rotor vanes for rotation together with the rotor about the rotor axis. The rotor wall 28 is thus positioned directly adjacent the valve plate 20.

Each rotor chamber includes a respective outlet port 30 in association therewith in which the outlet port communicates axially through the rotor wall 28 at a central location in the radial and circumferential directions relative to the corresponding boundaries to the rotor chamber. The outlet ports 30 permit fluid to be exhausted from the rotor chambers to the corresponding openings in the valve plate 20 as described in further detail below.

An outlet housing 31 is mounted adjacent the rotor housing 12 in proximity to the valve plate 20 to define an outlet chamber 32 therein which receives fluid exhausted from the outlet ports 30 of the rotor in the rotor housing. In this manner the valve plate is axially in series between the rotor housing 12 on one side thereof and the outlet housing 31 on the other side thereof. The outlet housing 31 is primarily defined by a cylindrical outer wall 34 of similar diameter as the peripheral wall 16 of the rotor housing so as to be substantially axially aligned therewith. A suitable end plate encloses the axially opposing end of the outlet chamber 32 as described in further detail below.

The rotor 14 is fixed onto an axle 36 which defines the rotor axis of rotation. The axle protrudes in the axial direction from one side of the rotor to extend through the valve plate 20 and the outer plate enclosing the opposing end of the outlet chamber 32. Bearings 38 are centrally mounted in each of the valve plate and the opposing plate of the outlet chamber for rotatably supporting the axle 36 extending therethrough. Accordingly the two bearings 38 are supported at axially spaced positions along the axle 36 corresponding to the axial dimension of the outlet chamber.

The portion of the axle 36 which protrudes externally beyond the outlet chamber defines a rotary output 40 of the hydraulic turbine motor.

Hydraulic fluid is injected into the rotor within the main chamber of the rotor housing by a series of injectors including first injectors 42 and second injectors 44. Two first injectors and two second injectors are provided for a total of 4 injectors at equally circumferentially spaced positions about the periphery of the rotor housing. The injectors alternate between first injectors and second injectors in the circumferential direction such that the two first injectors are diametrically opposite one another. Similarly the two second injectors are diametrically opposite from one another.

Each of the injectors comprises a fluid port which communicates in a tangential direction relative to the rotor housing to communicate through the peripheral wall 16 and inject hydraulic fluid into the main chamber in a common forward direction of rotation of the rotor.

In operation, a hydraulic pump is provided to supply a flow of hydraulic fluid under pressure through an inlet manifold so that a common supply of pressurized fluid is provided to all four injectors. The fluid injected into the rotor chambers is subsequently exhausted from the rotor housing by the valve mechanism described in further detail below so that the hydraulic fluid ends up in the outlet chamber 32 where the fluid can then be returned to the reservoir of the hydraulic pump.

The valve mechanism is provided for controlling the exhausting of the hydraulic fluid from the rotor chambers to the outlet chamber. The valve mechanism is primarily defined by the valve plate 20 which remains fixed relative to the rotor housing and the injectors. The valve plate specifically includes two outlet openings 46 formed therein which permits flow of hydraulic fluid in the axial direction therethrough when aligned with outlet ports of respective ones of the outlet rotor chambers.

The two outlet openings 46 are located in alignment with the pair of first injectors respectively so as to be similarly diametrically opposite with one another. Furthermore, each outlet opening comprises an arcuate slot at a radial distance from the rotor axis which is equal to the radial distance of the outlet ports. The width of the slots in the radial direction is substantially equal to, and aligned with, the corresponding dimension of the outlet ports. Each arcuate slot also extends in a circumferential direction a distance which is slightly greater than the circumferential distance between two adjacent outlet ports of respective adjacent rotor chambers. In this manner, two adjacent chambers are arranged to commonly communicate with the outlet opening 46 through a small portion of rotation of the rotor. Through a majority of the rotation however, fluid can only be exhausted through the outlet opening 46 from a single outlet port of the rotor in communication therewith.

In operation, any rotor chamber in communication with one of the second fluid injectors does not include an outlet opening in communication therewith such that any fluid injected into rotor chambers by the second injectors serves only to build pressure within the respective rotor chambers and maintain the elevated pressure therein through approximately 90 degrees of rotation or until the rotor chamber reaches the first injectors in alignment with the outlet openings 46 respectively.

Alternatively, at the first injectors, any fluid injected into a corresponding rotor chamber in communication with the first injector simultaneously communicates with one of the respective outlet openings 46 for simultaneously exhausting fluid from the rotor chamber through the outlet port and outlet opening into the outlet chamber respectively. The outlet openings are located such that the rotor chamber begins communication with the outlet opening 46 just prior to communication with the first injector to allow built-up pressure from the second injectors to be exhausted prior to communication with the first injectors. Throughout the full range of communication with the first injector, the respective rotor chamber remains in communication with the outlet port for simultaneous exhausting of fluid during the full range of injection from the first injector. The outlet openings are arranged to close the outlet port only after the first injector is no longer in communication with the respective rotor chamber.

In this manner, injection of fluid at the second injectors 44 substantially provides the function of a positive displacement motor due to the injection of fluid positively forcing the rotation of the rotor prior to exhausting of the fluid at a subsequent stage of the rotation of the rotor. Alternatively the injection of the fluid at the first injectors where fluid is simultaneously exhausted through the outlet ports substantially provides the function of a continuous flow turbine.

Turning now more particularly to the embodiment of FIGS. 1 through 4, the other plate opposite the valve plate 20 for enclosing the other end of the outlet chamber in this instance merely comprises a singular end wall 50 which supports an oil seal with a suitable cover at the external side thereof through which the axle protrudes to define the rotary output 40. The bearings 38 and the corresponding bearing covers in this instance are located on the inner sides of the plates within the interior of the outlet chamber.

Figure 5:
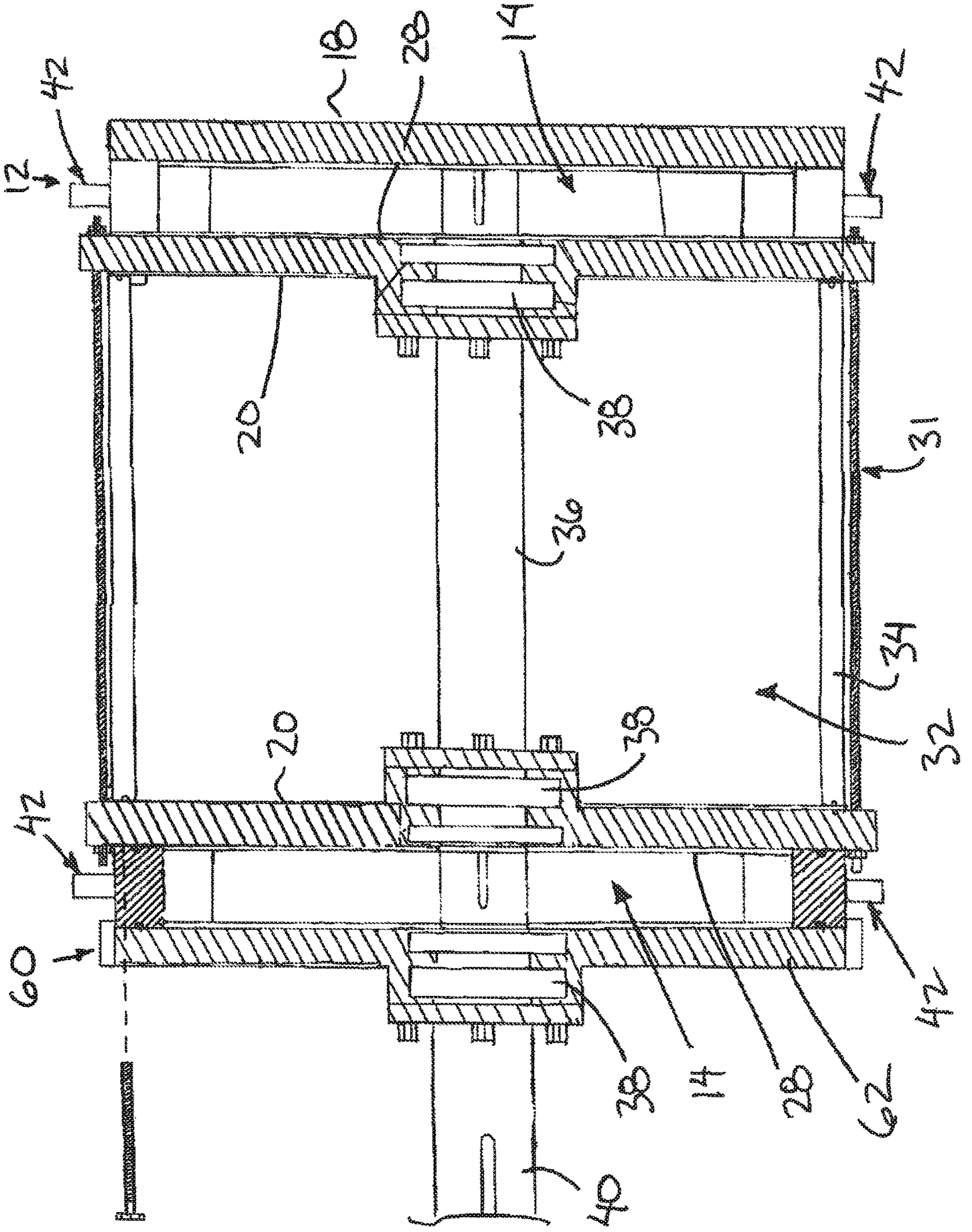
FIG. 5 is a sectional side view of the turbine motor of the present invention according to a second embodiment.
Figure 6:
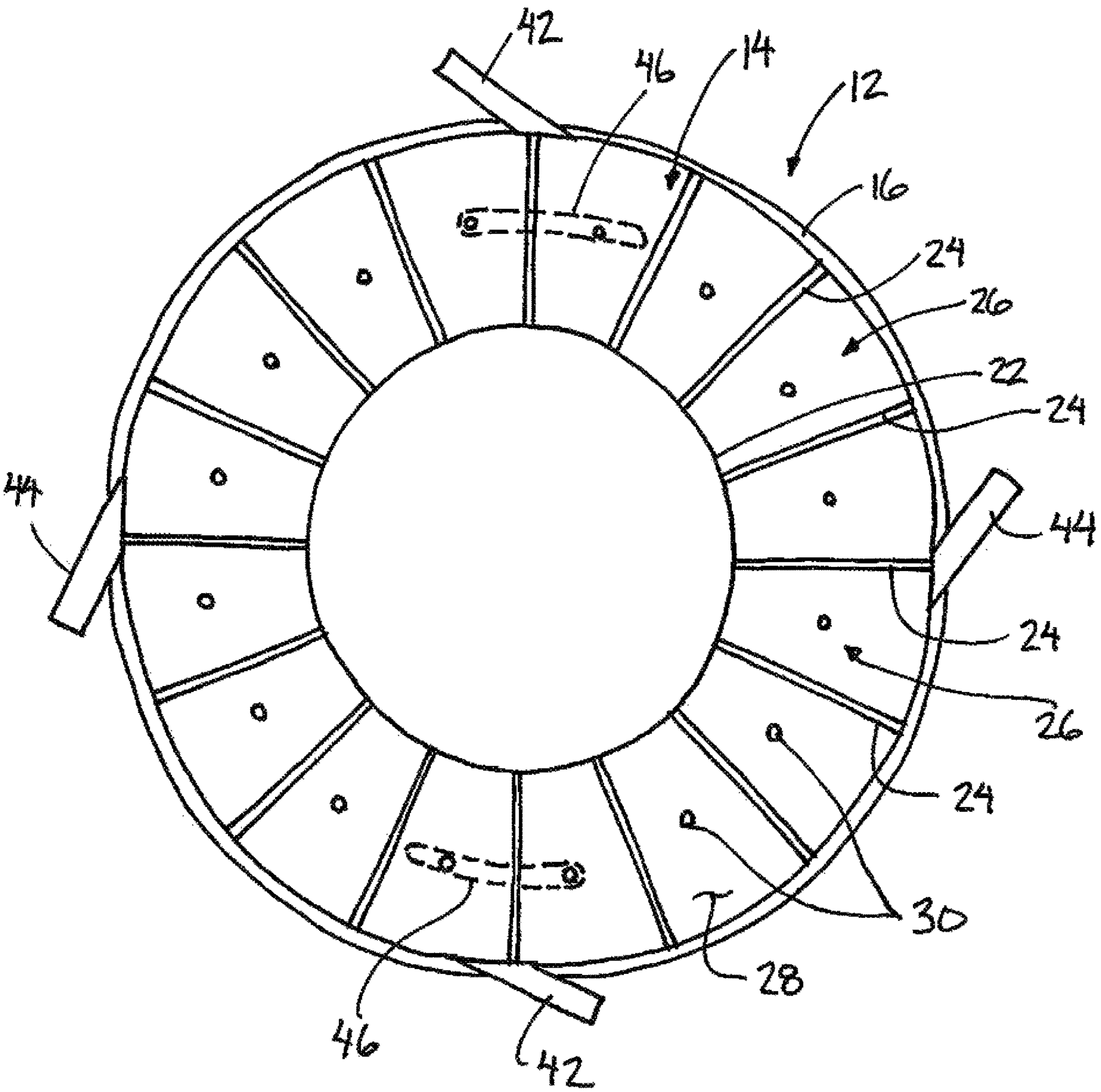
FIG. 6 is an end elevational view of the rotor inside the rotor housing according to the second embodiment of FIG. 5.

Turning now to the embodiment of FIGS. 5 and 6, the end wall 50 is instead replaced with an auxiliary rotor housing 60 of substantially identical configuration such that the auxiliary rotor housing includes a similar arrangement of a rotor rotatable therein, with injectors for injecting fluid and a valve mechanism for controlling the exhausting of the fluid to the outlet chamber. In this instance, the valve plate 20 of the first rotor housing and the corresponding valve plate 20 of the second rotor housing define opposing ends of a common central outlet chamber 32. The second rotor housing differs in configuration only in that the first end wall 18 of the first rotor housing is instead a corresponding outer wall 62 which includes an additional bearing and oil seal at a central location therein through which the axle is received to protrude externally and define the rotary output 40.

In either embodiment, the one or more rotors rotate together with the axle by the injection of hydraulic fluid at circumferentially spaced injection locations about the respective housings in a generally tangential direction relative to the rotor axis into selective ones of the rotor chambers. At the location of the first injectors, the outlet ports of the corresponding rotor chambers are intermittently opened during the injection of hydraulic fluid therein while the outlet ports of the chambers receiving fluid injected therein at the second injectors remain closed until the rotor chamber reaches a subsequent first injector location.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A hydraulic turbine motor comprising:

a rotor housing;

a rotor rotatably supported in the rotor housing for rotation about a respective rotor axis, the rotor defining a plurality of rotor chambers arranged circumferentially about the rotor, each rotor chamber having a respective outlet port;

a plurality of injectors supported at circumferentially spaced locations about the housing so as to be arranged to inject hydraulic fluid in a generally tangential direction relative to the rotor axis into selected ones of the rotor chambers, the injectors including at least one first injector and at least one second injector; and a valve mechanism configured to (i) open any outlet port in which the respective rotor chamber is in communication with said at least one first injector and (ii) maintain closed any outlet port while the respective rotor chamber is in communication with said at least one second injector such that any fluid injected into the rotor chambers by the at least one second injector serves only to build pressure within the respective rotor chamber.

2. The turbine motor according to claim 1 wherein the valve mechanism comprises an end wall of the rotor housing oriented transversely to the rotor axis which includes at least one outlet opening therein, said at least one outlet opening extending circumferentially so as to be arranged to communicate simultaneously with two adjacent ones of the outlet ports over a portion of the rotation of the rotor.

3. The turbine motor according to claim 1 wherein the rotor defines a number of rotor chambers which is more than double a number of the injectors.

4. The turbine motor according to claim 1 wherein said at least one first injector and said at least one second injector are equal in number.

5. The turbine motor according to claim 1 wherein the at least one first injector comprises a plurality of first injectors and the at least one second injector comprises a plurality of second injections, and wherein the first and second injectors alternate between one of the first injectors and one of the second injectors in a circumferential direction of the rotor.

6. The turbine motor according to claim 1 wherein the valve mechanism is arranged to open any outlet port in which the respective rotor chamber is in communication with said at least one first injector prior to communication with said at least one first injector.

7. The turbine motor according to claim 1 wherein the valve mechanism is arranged to maintain open any outlet port in which the respective rotor chamber is in communication with said at least one first injector until after said at least one first injector discontinues communication with the rotor chamber.

8. The turbine motor according to claim 1 further comprising:

an auxiliary housing similar in configuration to the rotor housing and including a rotor, a plurality of injectors, and a valve mechanism arranged in similar configuration to the rotor, the plurality of injectors and the valve mechanism of the rotor housing;

a common axle coupling the two rotors for rotation together about the rotor axis;

each valve mechanism comprising an end wall of the respective rotor housing oriented transversely to the rotor axis and including at least one outlet opening therein; and a common outlet chamber between the two rotor housings so as to be in direct communication with the outlet openings of the valve mechanisms of both rotor housings.

9. A method of operating a hydraulic turbine motor having a rotor housing, a rotor rotatably supported in the rotor housing for rotation about a respective rotor axis and defining a plurality of rotor chambers arranged circumferentially about the rotor, and an outlet port for each chamber, the method comprising:

injecting hydraulic fluid at circumferentially spaced injection locations about the housing in a generally tangential direction relative to the rotor axis into selected ones of the rotor chambers;

intermittently opening the outlet port of each chamber during the injection of hydraulic fluid into the chamber at one or more injection locations and maintaining the outlet port of each chamber closed during the injection of hydraulic fluid into the chamber at one or more other injection locations.

10. The method according to claim 9 including opening the outlet ports of adjacent ones of the rotor chambers over a portion of the rotation of the rotor at said one or more injection locations.

11. The method according to claim 9 including arranging said one or more injection locations where the outlet ports are opened to be less than half the number of rotor chambers.

12. The method according to claim 9 wherein the injection locations where the outlet ports are open and the injection locations where the outlet ports are closed are equal in number.

13. The method according to claim 9 wherein the injection locations alternate in a circumferential direction of the rotor between outlet ports which are opened and outlet ports which are closed during injection of hydraulic fluid.

14. The method according to claim 9 including opening the outlet ports prior to communication of the respective chamber with the respective injection location.

15. The method according to claim 9 including maintaining the opened outlet ports open until after the chamber no longer received injected hydraulic fluid therein.

* * * * *